US006775066B2

(12) United States Patent
Kurisu et al.

(10) Patent No.: US 6,775,066 B2
(45) Date of Patent: Aug. 10, 2004

(54) DIFFRACTIVE OPTICAL ELEMENT

(75) Inventors: Kenichi Kurisu, Osaka (JP); Keiji Fuse, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 269 days.

(21) Appl. No.: 10/051,023

(22) Filed: Jan. 22, 2002

(65) Prior Publication Data

US 2002/0101663 A1 Aug. 1, 2002

(30) Foreign Application Priority Data

Jan. 29, 2001 (JP) ...................................... 2001-019432

(51) Int. Cl.[7] .............................................. G02B 5/18
(52) U.S. Cl. ...................... 359/576; 359/569; 359/566
(58) Field of Search ................... 359/576, 569, 359/566; 438/166, 150; 216/24

(56) References Cited

FOREIGN PATENT DOCUMENTS

| EP | 0 629 592 A | 12/1994 |
|----|-------------|---------|
| JP | 10-300912 | 11/1998 |
| JP | 2000-280225 | 10/2000 |
| JP | 2000-280226 | 10/2000 |

OTHER PUBLICATIONS

W. Walecki, W. Patterson, A. Nurmikko, H. Luo, N. Samarth, J. Furdyna, M. Kobayashi, S. Durbin, and R. Gunshor, "Ultraviolet and Blue Holographic Lithography of ZnSe Epilayers and Heterostructures with Feature Size to 100 nm and Below," *Applied Physics Letters*, 57, No. 25, Dec. 1990, pp. 2641–2643.

K. Fuse, K. Ebata, T. Okada, K. Kurisu, and M. Shiozaki, "Optical Properties of ZnSe Diffractive Optical Elements for Spot Array Generation," *Proceedings of the SPIE*, vol. 3888, 2000, p. 497–508.

K. Kawamura, N. Sarukura, M. Hirano, and H. Hosono, "Holographic Encoding of Permanent Gratings Embedded in Diamond by Two Beam Interference of a Single Femtosecond Near–Infrared Laser Pulse," *Japanese Journal of Applied Physics*, vol. 39, No. 8A, Aug. 1, 2000, pp. L767–L769.

T. Ishihara, G. Brunthaler, W. Walecki, M. Hagerott, A. Nurmikko, N. Samarth, H. Luo, & J. Furdyna, "Distributed Feedback Operation of Optically Pumped ZnSe Quantum–well Lasers in the Blue–Green," *Applied Physics Letters*, vol. 60, No. 20, May 18, 1992, pp. 2460–2462.

J. Teteris & O. Nordman, "Relaxation Process of Holographic Gratings in Amorphous $As_2S_3$ Films," *Journal of the Optical Society of America*, vol. 14, No. 10, Oct. 1997, pp. 2498–2504.

*Primary Examiner*—Drew A. Dunn
*Assistant Examiner*—Fayez Assaf
(74) *Attorney, Agent, or Firm*—McDermott Will & Emery LLP

(57) ABSTRACT

The present invention provides a different optical element having superior optical characteristics. A polycrystalline substrate having crystal grains whose sizes are not more than 1 μm or an amorphous phase at the dry-etched surface thereof, or an upper film layer 8 formed on a polycrystalline substrate 1 being the same materials as that of the polycrystalline substrate 1, which has finer crystal grains than-those of the substrate. The upper film layer 8 is dry etched, and AR coat 6 is formed thereon.

13 Claims, 7 Drawing Sheets

DIFFRACTIVE OPTICAL ELEMENT

BACKGROUND OF THE INVENTION

1. Field of the Invention

The present invention relates to an improved diffraction optical element (DOE). In particular, it relates to the DOE having a smoothly etched surface substrate.

2. Description of the Prior Art

With the miniaturization of electronic components and electronic devices used in mobile telephones, personal computers, etc., there has been increasing demand for finer and higher speed drill processing. The application of a DOE has been promoted as a key device to satisfy this demand.

Unlike conventional optical components utilizing refraction and/or reflection, the DOE utilizes optical diffraction and directly controls the optical phases, and therefore, a wide range of applications including, multi-spot beam splitters, for example, can be expected.

As shown in FIG. 5, the DOE can split one processing laser beam into multiple spots. Simultaneous processing at plural spots, shaping patterns such as marking, and non-circular-shape processing have been achieved with high-speed.

FIG. 4 shows an example wherein the DOE is utilized in drill processing using a carbon dioxide gas laser to split one processing laser beam into multiple spots and simultaneously drill a plurality of holes. (Japanese Patent Laid-Open No. 2000-280226 and Japanese Patent Laid-Open No.2000-280225).

SUMMARY OF THE INVENTION

The present invention provides an improved DOE which has a smoothly etched surface.

The DOE of the present invention comprises a polycrystalline substrate which has an upper film layer having the same material as the substrate, and having finer polycrystalline grains than that of the substrate or having an amorphous phase laminated on the substrate.

It is preferable that the DOE be provided with a polycrystalline substrate whose diameter of crystal grains at an etched surface is not more than 1 μm.

It is also preferable that the DOE be provided with an amorphous phase at an etched surface of the substrate.

DETAIL DESCRIPTION OF THE INVENTION

ZnSe, having excellent transmittance at infrared optical wavelength, has been used as material of optical elements for a carbon dioxide gas laser (utilizing wavelength is 9.3 μm or 10.6 μm). In general, as ZnSe having a diameter of 1 or 2 inches and a thickness of several millimeters for an optical element, polycrystals have been used instead of a single crystal considering the cost aspect. In most cases, a high purity polycrystalline ZnSe synthesized by a chemical vapor deposition (CVD) method has been used.

Figure 6:
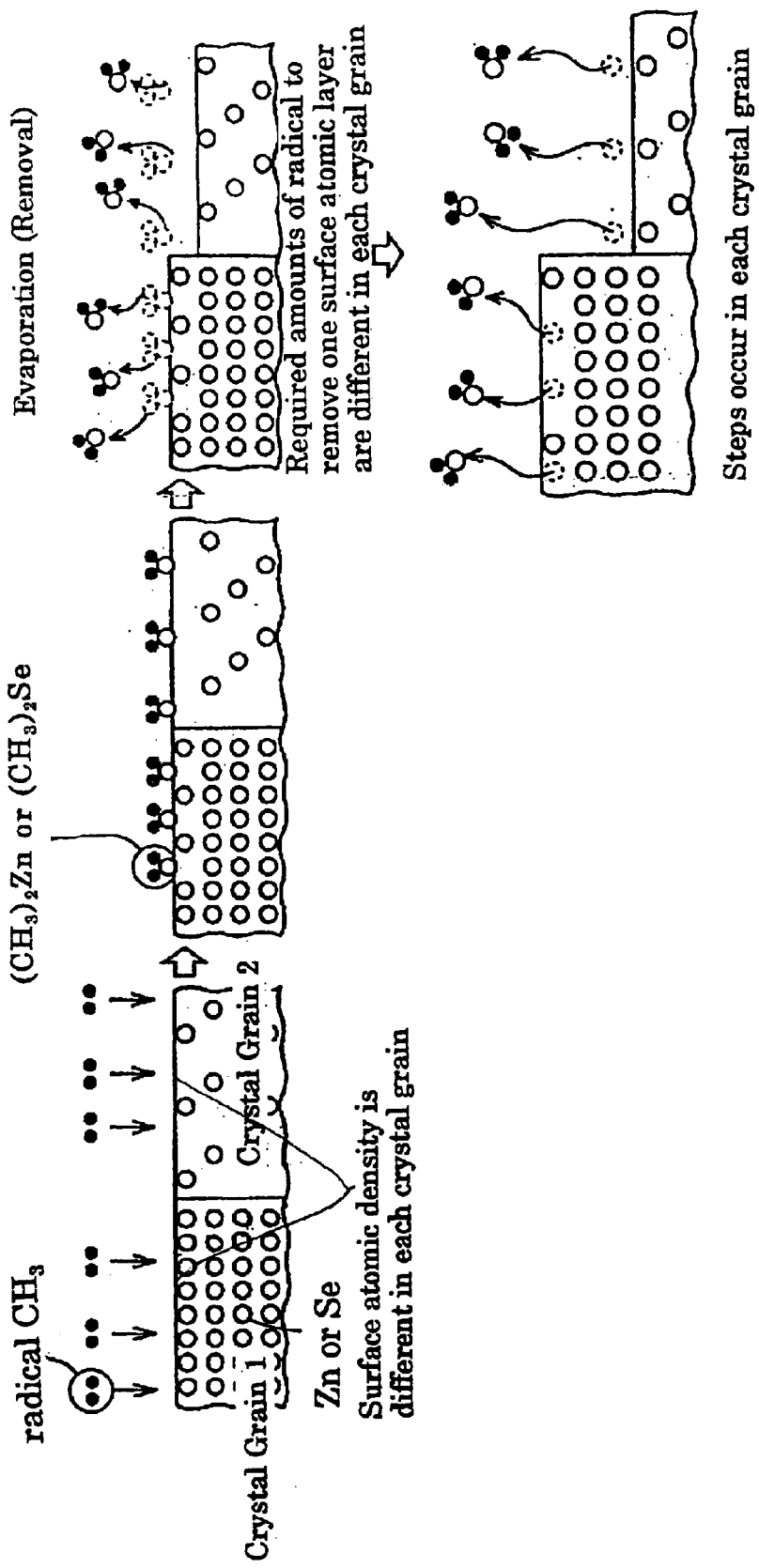
FIG. 6 is a schematic figure showing problems during manufacturing conventional DOE with the use of hydrocarbon gas.

In the reactive ion etching (RIE) method used for manufacturing DOE, as referred to in FIG. 6, a chemical reaction occurs between radicals generated from the reactive gas and ZnSe on the substrate surface, generating bi-products. These bi-products are then removed by sputtering. Thus the etching progresses.

Hydrocarbon-based gas, which is commonly used for a single crystal, has been known as etching gas of the RIE method. However, if hydrocarbon-based gas is used as the etching gas, the etching rate depends heavily on the crystal orientation of the polycrystalline grains.

As a result, the surface of the ZnSe polycrystals becomes rough, deteriorating the optical characteristics of the DOE such as deviation of the diffracted optical intensity and focussed position accuracy.

As described above, the present invention provides an improved DOE which has a smoothly etched surface.

Also the DOE of the present invention comprises a polycrystalline substrate which has an upper film layer having the same material as the substrate, and having finer polycrystalline grains than that of the substrate or having an amorphous phase laminated on the substrate. The surface having finer polycrystalline grains or an amorphous phase can be easily obtained by laminating an upper film layer.

The DOE of the present invention is preferably provided with a polycrystalline substrate whose sizes of crystal grains at an etched surface are not more than about 1 μm. The sizes of crystal grains at an etched surface are more desirably not more than about 0.5 μm, because smaller diameter of crystal grains improves the precision of the etched surface.

The DOE of the present invention is also preferably provided with an amorphous phase substrate at an etched surface. The reason is that a more smoothly etched surface can be obtained because of the surface having no crystal grain. The surface having finer crystal grains or an amorphous phase can be obtained by selecting an appropriate laminating condition, or applying heat treatments, surface treatments and so on.

As the surface of the substrate or the upper film layer has finer crystal grains or an amorphous phase to be etched, the etching rate of the surface becomes more even than that of conventional polycrystalline substrates. This is because the finer polycrystalline layer or the amorphous phase layer is less affected by the etching rate dependency on the crystal orientation, compared with the conventional substrate having coarse polycrystalline grains. As a result, the surface of the DOE of the present invention is improved to become smooth and then the deviation of the optical diffraction intensity and/or optical irradiated position becomes small.

A buffer layer between the upper film layer and the substrate is more suitably provided in order to prevent peeling-off of the upper film layer from the substrate.

The buffer layer is preferably selected from materials suitable for transmitting a light at operating wavelength. Materials for the buffer layer are preferably to have an optical absorption coefficient not more than 10 cm$^{-1}$. Considering the buffer layer thickness to prevent peeling-off, an optical absorption coefficient is limited to the above-described value.

ZnSe is more suitable for the polycrystalline substrate, especially for a carbon-dioxide-laser-DOE in the present invention.

More suitably, the substrate is formed by the CVD method, because a high purity substrate which is superior in the optical transmittance can be obtained.

For example, the buffer layer is preferably selected from one of the fluorine compounds such as barium di-fluoride ($BaF_2$), thorium tetra-fluoride ($ThF_4$) and ytterbium tri-fluoride ($YbF_3$) for the carbon-dioxide-laser-DOE.

In addition, it is desirable that the buffer layer be formed by a vapor phase growing method, because a high purity layer which is superior to the optical transmittance can be obtained for the same reason as in the substrate.

In addition, the upper film layer and the buffer layer may be formed by one of the vapor deposition method (Electron Beam method, Ion Assist method, and Resistant Heat method). This is because the thickness of the film layer can be easily controlled by such methods.

In addition, the etching method is preferably applied by a dry etching method, and more suitably a RIE method. The precision of an etched shape improves, because the etching direction has greater controllability compared with the plasma etching method.

PREFERRED EMBODIMENT OF THE INVENTION

Hereinafter, an embodiment of the present invention will be described in detail.

Figure 1:
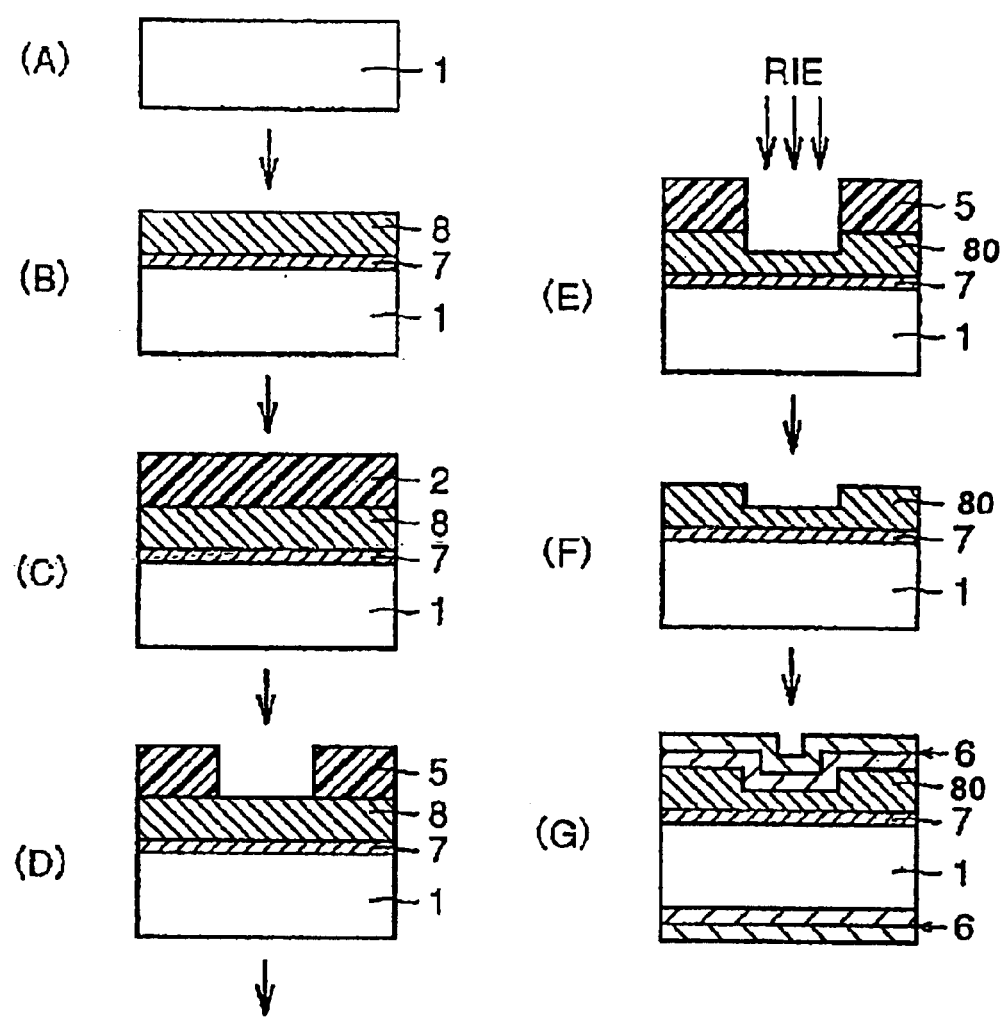
FIG. 1 is a diagram showing the general steps for manufacturing the DOE related to the preferred embodiment of the present invention.

FIG. 1 is an example of a schematic sectional view in each step of manufacturing a semiconductor device for a DOE according to the present invention.

Step A: A ZnSe polycrystalline substrate 1 is prepared.

Step B: A $ThF_4$ film 7 is formed on the substrate 1. An upper film layer having the same material as the substrate and having finer polycrystalline grains than those of the substrate or an amorphous phase is laminated on the film 7. In this example, a ZnSe film layer 8 is laminated as the upper film layer.

The thickness of at least 3 μm is necessary for the ZnSe upper film layer 8, because the etching depth of at least 3 μm is necessary in the upper film layer.

The $ThF_4$ film layer 7 is to prevent peeling-off of the ZnSe upper film layer 8 from the polycrystalline substrate 1.

The $ThF_4$ film layer 7 is unnecessary under the condition that the detachment of the ZnSe upper film layer 8 from the polycrystalline substrate 1 can be prevented. For example, the ZnSe upper film layer 8 can be improved adhesion properties by applying a surface treatment in the dry or wet process in order to remove a surface layer which is changed quality during a surface polishing or contained impurities thereof. By applying the above treatment, such $ThF_4$ film layer 7 can be omitted.

Step C: A resist layer 2 is formed on the ZnSe upper film layer 8.

Step D: The resist layer 2 is selectively irradiated by means of a photomask (not shown) and formed a printed pattern thereon. Then, by developing the resist layer 2, a resist pattern 5 is formed.

Step E: The ZnSe upper film layer 8 is dry etched with RIE method by using the resist pattern 5 as a mask to form a patterned ZnSe upper film layer 80. As the ZnSe upper film layer 8 has fine crystal grains or an amorphous phase, the etching rate is not strongly affected by the crystal orientation. As a surface layer having fine crystal grains or an amorphous phase has random crystal-oriented grains or no crystal grain, etching rate of the substrate is not dependent on the crystal orientation as a whole. That is the reason why the etched surface of the ZnSe upper film layer 80 does not become coarse.

Step F: The resist pattern 5 is removed.

Step G: After anti-reflection (AR) coating 6 has been formed on the ZnSe upper film layer 80 and a bottom surface of the polycrystalline substrate 1, DOE manufacturing is completed.

EXAMPLE

According to the above-described manufacturing steps, a polycrystalline ZnSe with crystal grain sizes of about 60 μm, manufactured by the CVD method had been cut and polished to form a substrate having a diameter of 50 mm and a thickness of 5 mm (whose surface roughness (Ra) was 2 nm). A $ThF_4$ film layer of 0.2 μm thickness and a ZnSe upper film layer having a thickness of 6 μm were laminated on the polished substrate by the resistance-heat vapor deposition method. The ZnSe upper film layer had crystalline having crystal grains of about 0.06 μm width in a growth direction. In addition, the Ra of the ZnSe upper film layer was 2 nm, which is the same as the ZnSe substrate.

The ZnSe upper film layer deposited on the ZnSe substrate was etched by the RIE method.

The etching condition was as follows:

Gas Material: Methane Gas

Flow Rate: 5 sccm

Gas Pressure: 1 Pa

RF Power: 0.5 W/cm$^2$

Etching Time: 180 min.

Figure 2:
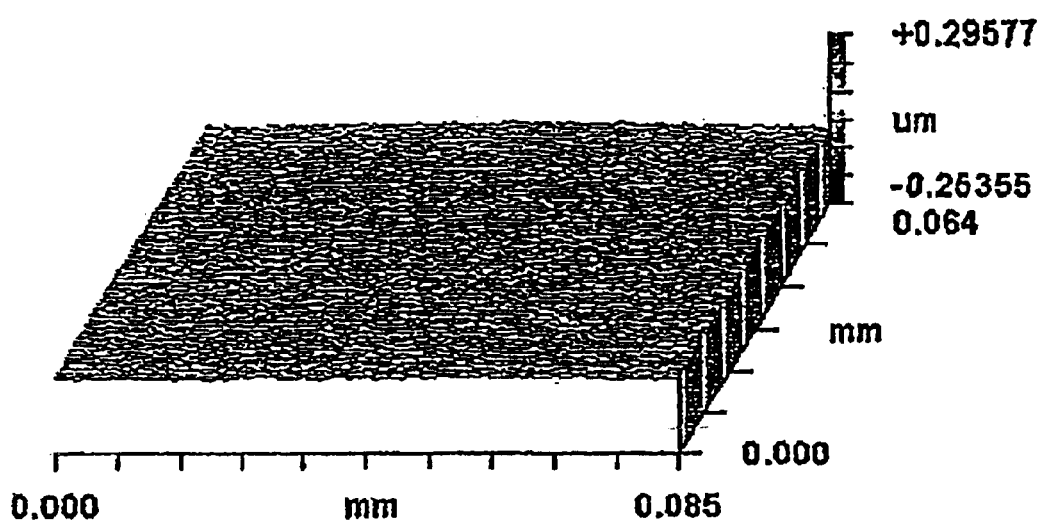
FIG. 2 shows a surface state of zinc selenide (ZnSe) vapor-deposited film after dry etching according to the present invention.

FIG. 2 shows a surface state of the etched ZnSe upper film layer in the present invention. It was confirmed that the surface was not rough. Etching depth was about 4 μm, and Ra was 3 nm.

The DOE obtained by the example showed satisfactory optical characteristics for DOE.

COMPARATIVE EXAMPLE

Figure 3:
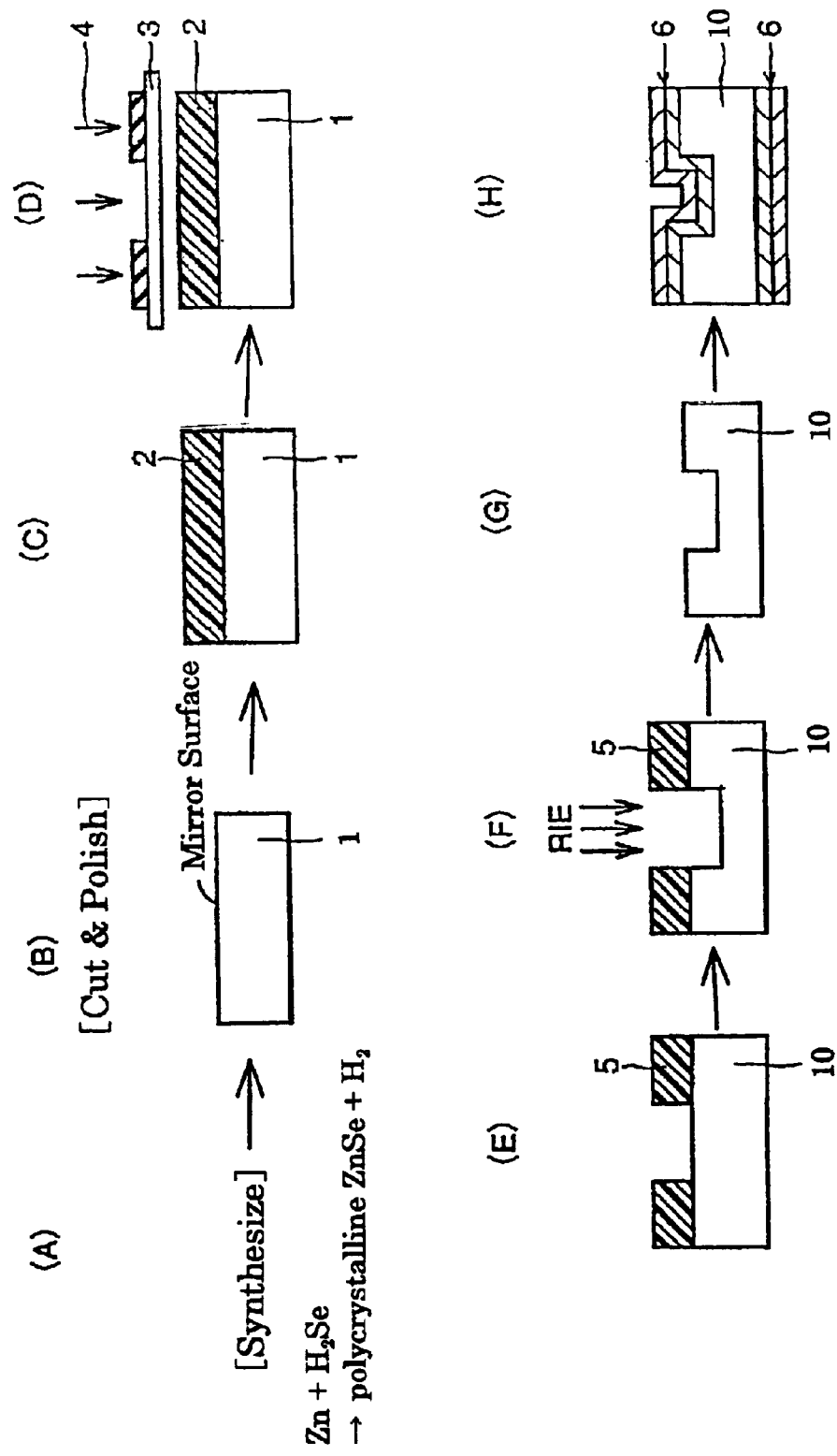
FIG. 3 shows a process flow chart of manufacturing a conventional DOE.
Figure 4:
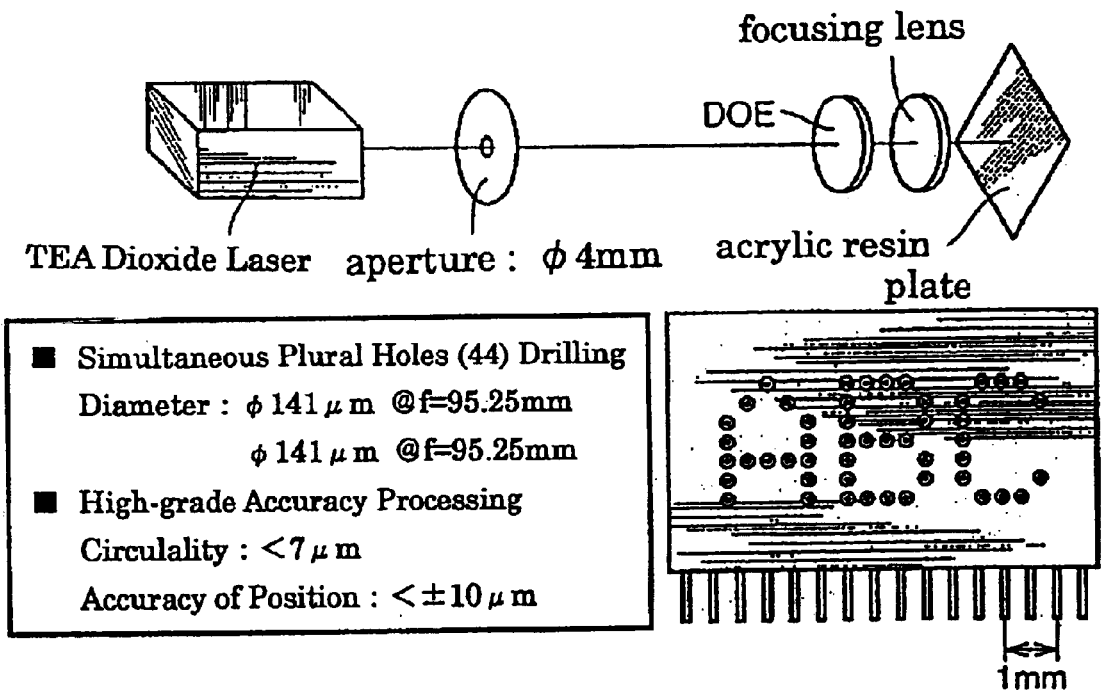
FIG. 4 shows an example of the DOE application to the laser drill processing.
Figure 5:
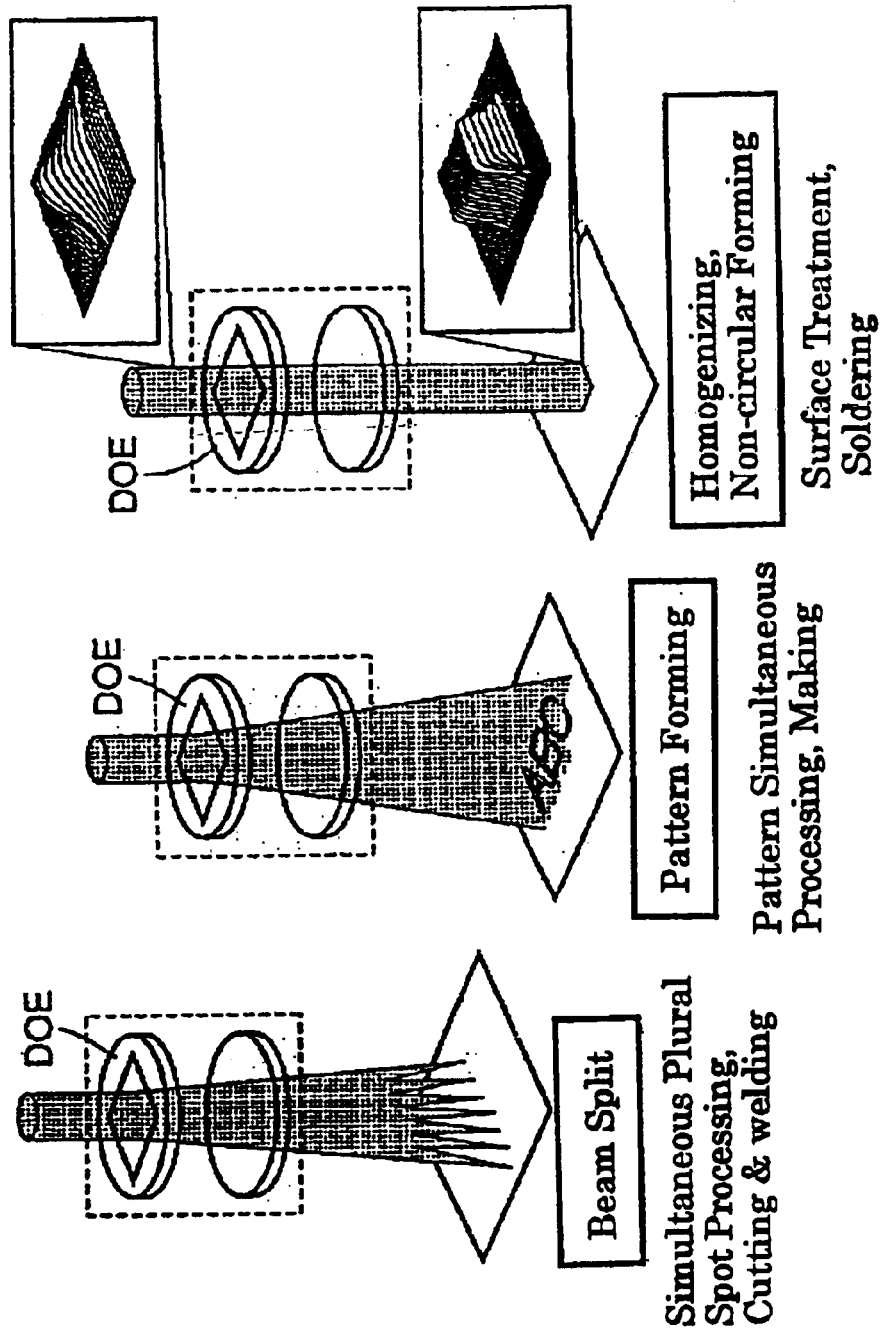
FIG. 5 shows three examples of the DOE application to other laser processing.

As a comparative example, a DOE using polycrystalline ZnSe was manufactured by the following steps as shown in FIG. 3.

Step A: A polycrystalline ZnSe was synthesized from Zn and $H_2Se$ by the chemical reaction: $Zn+H_2Se \rightarrow ZnSe+H_2$.

Step B: The polycrystalline ZnSe was cut and a ZnSe polycrystalline substrate 1 was formed, and the surface thereof was polished.

Step C: A resist layer 2 was formed on the ZnSe polycrystalline substrate 1.

Step D: Light 4 was selectively irradiated on the resist layer 2 by means of a photomask 3 to form a printed pattern thereon.

Step E: The resist layer 2 was developed to form a resist pattern 5.

Step F: RIE with the use of hydrocarbon gas, which had been normally used in single crystal processing, was performed on the ZnSe polycrystalline substrate 1 using the resist pattern 5 to form a patterned ZnSe polycrystalline substrate 10.

Step G: The resist pattern 5 was removed to form the patterned ZnSe polycrystalline substrate 10.

Step H: An anti-deflection (AR) coating layer 6 was formed on both surfaces of the patterned ZnSe polycrystalline substrate 10.

A DOE was obtained through the above series of steps (A through H).

Figure 7:
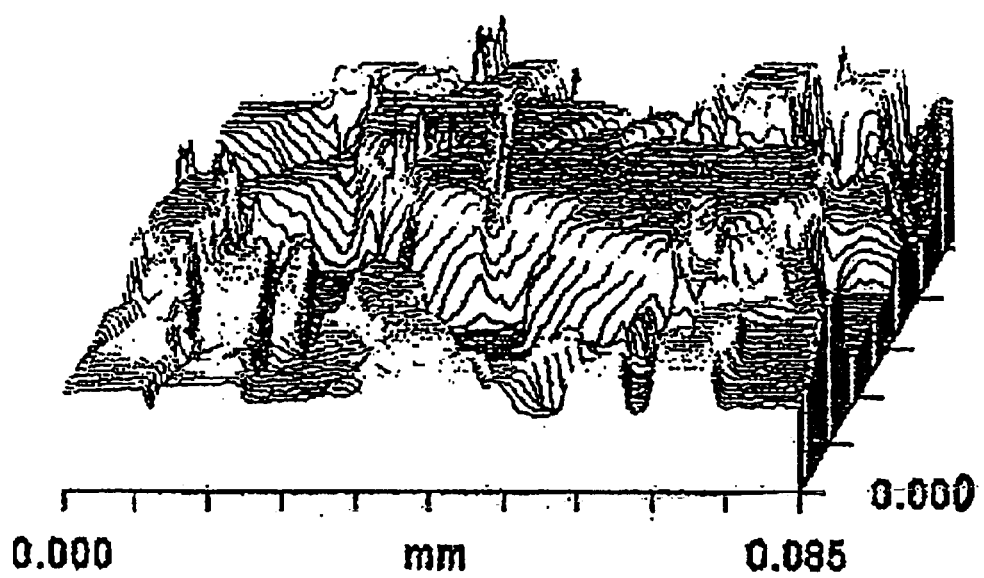
FIG. 7 shows the surface state of a ZnSe substrate after conventional direct etching.

FIG. 7 shows a surface of the ZnSe substrate which has no vapor deposited film layer on the ZnSe polycrystalline substrate and directly etched on the same condition as mentioned above. The etching depth was about 4 μm, and the Ra was 80 nm. The surface state was not a mirror surface.

The DOE obtained by the comparative example showed inferior optical characteristics compared with that obtained by the example.

It should be understood that the embodiment herein disclosed is an illustration in all aspects, and therefore has no limitation. The scope of the present invention is not indicated by the foregoing descriptions but by the scope of the claims of the invention and it is intended to include therein equivalents of the claims of the invention and all modifications within the scope thereof.

What is claimed is:

1. A diffractive optical element comprising
   a polycrystalline substrate and
   an upper film layer which is laminated on the substrate, wherein the material of the upper film layer
   is the same material as the substrate, and having finer crystal grains compared with crystal grains of
   the substrate or having an amorphous structure, and
   the upper film layer is dry etched.

2. A diffractive optical element according to claim 1, further comprising a buffer layer provided between the substrate and the upper film layer.

3. A diffractive optical element according to in claim 2, wherein the buffer layer is selected from the materials having an optical absorption coefficient of not more than 10 $cm^{-1}$ at the operating wavelength.

4. A diffractive optical element according to claim 3, wherein the substrate is made of ZnSe.

5. A diffractive optical element according to claim 2, wherein the substrate is made of ZnSe.

6. A diffractive optical element according to claim 2, wherein the buffer layer is made of a fluorine compound.

7. A diffractive optical element according to claim 2, wherein the upper film layer and the buffer layer are formed by a vapor phase growth method.

8. A diffractive optical element according to claim 2, wherein the upper film layer and the buffer layer are formed by a vapor deposition method.

9. A diffractive optical element according to claim 1, wherein the substrate is made of ZnSe.

10. A diffractive optical element according to claim 9, wherein the substrate is formed by a chemical vapor deposition method.

11. A diffractive optical element according to claim 1, wherein the dry etching is performed by a reactive ion etching method.

12. A diffractive optical element comprising
    a ZnSe polycrystalline substrate formed by a chemical vapor deposition method and
    an upper film layer which is formed by a vapor deposition method on the substrate, wherein the
    material of the upper film layer is the same material of the substrate, and having finer crystal grains
    compared with crystal grains of the substrate or having an amorphous structure, and
    the upper film layer is dry etched by a reactive ion etching method.

13. A diffractive optical element according to claim 12, further comprising a buffer layer made of a fluorine compounds having been formed by a vapor deposition method.

* * * * *

UNITED STATES PATENT AND TRADEMARK OFFICE
CERTIFICATE OF CORRECTION

PATENT NO. : 6,775,066 B2
DATED : August 10, 2004
INVENTOR(S) : Kenichi Kurisu et al.

It is certified that error appears in the above-identified patent and that said Letters Patent is hereby corrected as shown below:

<u>Column 6,</u>
Lines 36-37, change "compounds" to -- compound --

Signed and Sealed this

Seventh Day of December, 2004

JON W. DUDAS
*Director of the United States Patent and Trademark Office*